US010606505B2

(12) United States Patent
Gerphagnon et al.

(10) Patent No.: US 10,606,505 B2
(45) Date of Patent: Mar. 31, 2020

(54) METHOD AND DEVICE FOR SAVING DATA IN AN IT INFRASTRUCTURE OFFERING ACTIVITY RESUMPTION FUNCTIONS

(71) Applicant: BULL SAS, Les Clayes Sous Bois (FR)

(72) Inventors: Jean-Olivier Gerphagnon, Seyssins (FR); Corine Marchand, Grenoble (FR); Philippe Lachamp, Sassenage (FR)

(73) Assignee: BULL SAS, Les Clayes Sous Bois (FR)

( * ) Notice: Subject to any disclaimer, the term of this patent is extended or adjusted under 35 U.S.C. 154(b) by 132 days.

(21) Appl. No.: 14/267,829

(22) Filed: May 1, 2014

(65) Prior Publication Data
US 2014/0331018 A1    Nov. 6, 2014

(30) Foreign Application Priority Data

May 2, 2013   (FR) ...................................... 13 54054

(51) Int. Cl.
*G06F 3/06*   (2006.01)
*G06F 11/00*  (2006.01)
(Continued)

(52) U.S. Cl.
CPC .............. *G06F 3/065* (2013.01); *G06F 3/067* (2013.01); *G06F 3/0617* (2013.01);
(Continued)

(58) Field of Classification Search
USPC .......................................................... 707/1
See application file for complete search history.

(56) References Cited

U.S. PATENT DOCUMENTS 5,742,792 A  *  4/1998  Yanai .................... G06F 3/0601
                                                        710/1
5,917,723 A  *  6/1999  Binford ............... G06F 12/0804
                                                        700/11
(Continued)

FOREIGN PATENT DOCUMENTS

WO    WO 2004/025470 A1    3/2004

OTHER PUBLICATIONS

Sun Microsystems, Inc., Sun Intel Adaptec RAID User's Guide, Jun. 2009 Revision A, Appendix A pp. 1-10.*
(Continued)

*Primary Examiner* — Ann J Lo
*Assistant Examiner* — Michelle T Bechtold
(74) *Attorney, Agent, or Firm* — Pillsbury Winthrop Shaw Pittman LLP

(57) ABSTRACT

The saving of data in an information technology (IT) infrastructure offering activity resumption functions is disclosed. For these purposes, a saving system is provided with at least one first and one second sets of data storage and at least one first and one second memory controllers associated with the first and second data storage, respectively. The saving system is furthermore provided with a microcontroller configured to duplicate a stream of commands and of data destined for the first memory controller to the second memory controller in a mode of normal use allowing a local replication of data in the second set of data storage and to address a distinct stream of commands and of data to each of the first and second memory controllers in a mode of remote replication.

19 Claims, 5 Drawing Sheets

(51) Int. Cl.
*G06F 11/20* (2006.01)
*G06F 11/10* (2006.01)

(52) U.S. Cl.
CPC ............ *G06F 3/0659* (2013.01); *G06F 11/00* (2013.01); *G06F 11/2074* (2013.01); *G06F 11/1076* (2013.01)

(56) References Cited

U.S. PATENT DOCUMENTS

| | | | | |
|---|---|---|---|---|
| 6,701,385 | B1* | 3/2004 | Young | G06F 3/0613 710/1 |
| 2002/0016827 | A1 | 2/2002 | McCabe et al. | |
| 2002/0194528 | A1* | 12/2002 | Hart | G06F 11/0727 714/6.12 |
| 2003/0126107 | A1 | 7/2003 | Yamagami | |
| 2003/0217119 | A1* | 11/2003 | Raman | H04L 67/1095 709/219 |
| 2004/0260736 | A1* | 12/2004 | Kern | G06F 11/2058 |
| 2005/0071391 | A1* | 3/2005 | Fuerderer | G06F 17/30 |
| 2011/0055501 | A1 | 3/2011 | Wake | |
| 2013/0024635 | A1* | 1/2013 | Araki | G06F 3/0605 711/162 |

OTHER PUBLICATIONS

INPI, Preliminary Search Report, dated Sep. 30, 2013, for French Application No. 1354054, corresponding to the subject application.

\* cited by examiner

METHOD AND DEVICE FOR SAVING DATA IN AN IT INFRASTRUCTURE OFFERING ACTIVITY RESUMPTION FUNCTIONS

CROSS-REFERENCE TO RELATED APPLICATIONS

This application claims the benefit of priority to French Patent Application No. 1354054, entitled "Method and Device for Saving Data in an IT Infrastructure Offering Activity Resumption Functions," filed on May 2, 2013, which is hereby expressly incorporated by reference in its entirety.

BACKGROUND

Field

The present application relates to the saving of data in a multi-site IT system and more particularly to a method and a device for saving data, in particular for computers or high-performance computers, in an IT infrastructure offering activity resumption functions.

Description of the Related Technology

An IT infrastructure offering activity resumption functions (also called disaster recovery) allows, in the case of major or significant crises of an IT center that are related, for example, to an earthquake or a terrorist attack, the rebooting of this IT center. It thus allows, in the case of mishap, the installation of an IT system capable of handling the IT needs required for service continuity, on which the survival of a business generally depends.

It is appropriate, in an IT infrastructure offering activity resumption functions, to be able to provide and implement resources required for the execution of applications, and also to offer a data recovery procedure.

For these purposes, all or some of the data processed and stored by an IT center of an IT infrastructure offering activity resumption functions can be replicated, that is to say copied and kept up to date, in at least one other IT center of another site.

This replication of data can be carried out according to a synchronous saving mode according to which data written or modified on a local disk are immediately copied over to or modified on a remote disk or an asynchronous saving mode according to which the modified data are copied over or modified at regular intervals.

The replication of data in an IT infrastructure offering activity resumption functions and involving at least two remote sites, each comprising a compliant copy of the whole set of data of the other remote site, is a complex problem.

Firstly, it may be necessary to connect the remote sites to one another with the aid of communication links offering sufficient bitrates to allow the replication of the data. For these purposes, links dedicated to high-bitrate, such as fiber optic links, can be used.

Moreover, as observed previously, the data must be synchronized between the remote sites. The synchronization uses software and/or hardware mechanisms typically implementing tools making it possible to detect modifications of the data so as to identify the data to be replicated.

Finally, the storage devices implemented on each site should be disturbed as little as possible by the replication mechanisms, in particular during the writing phases, so as not to degrade the performance of the IT systems implemented on each site.

FIG. 1 illustrates an example of an IT infrastructure offering activity resumption functions. This infrastructure 100 implements two distinct sites 105-1 and 105-2 each comprising computation nodes 110, storage racks 115, storage servers 120 and gateways 125. A high-bitrate communication link 130 connects the IT systems of the sites 105-1 and 105-2 thus allowing a replication of the data of one site on the other. Whereas in certain embodiments, the IT systems of the sites 105-1 and 105-2 are identical, they may be different.

It is observed that access to the data in storage racks, via dedicated servers such as, for example, input/output servers implementing shared and/or parallel local file systems, for example Lustre or Network File System (NFS), can often be critical, in particular in the context of high-performance computers. Indeed, in such a context, data access performance is generally extremely significant and no foreseen event (for example the synchronization of data with a remote site) or unforeseen event should disturb write-access and/or read-access to the storage systems. Stated otherwise, data recovery should have no real impact on the data storage system from which data are recovered or, at the very least, as weak an impact as possible.

The application makes it possible to solve at least one of the problems set forth above.

SUMMARY

The subject of the application can thus be a device for saving data in an IT infrastructure offering activity resumption functions, this device comprising the following means,
  at least one first and one second sets of data storage;
  at least one first and one second memory controllers, the first memory controller being associated with the first set of data storage and the second memory controller being associated with the second set of data storage; and
  microcontroller configured to duplicate a stream of commands and of data destined for the first memory controller to the second memory controller in a mode of normal use allowing a local replication of data in the second set of data storage and to address a distinct stream of commands and of data to each of the first and second memory controllers in a mode of remote replication.

The device thus makes it possible to limit the effects of a data replication on the performance of a storage system in the case of multi-site or multi-storage synchronization.

According to a particular embodiment, the microcontroller can be furthermore configured to synchronize a set of data stored in the second set of data storage with a set of corresponding data stored in the first set of data storage subsequent to a remote replication and before a local replication.

According to a particular embodiment, the first set of data storage may comprise at least two subsets of data storage allowing a duplication of data between the at least two subsets of data storage so as to improve the reliability of the storage system.

According to a particular embodiment, the at least two subsets of data storage can be configured to store like data elements.

In another aspect, there is also a method for a computer for saving data in an IT infrastructure offering activity resumption functions, this method allowing the saving of data in a device comprising at least one first and one second sets of data storage, at least one first and one second memory controllers, the first memory controller being associated with the first set of data storage and the second memory controller being associated with the second set of data storage and this method comprising, duplication of a stream of commands and of data destined for the first memory controller to the second memory controller in a mode of normal use allowing a local replication of data in the second set of data storage and, in response to a remote replication command, transmission of a distinct stream of commands and of data to each of the first and second memory controllers allowing a remote replication.

The method thus makes it possible to limit the effects of a data replication on the performance of a storage system in the case of multi-site or multi-storage synchronization.

According to a particular embodiment, the method furthermore may comprise synchronizing a set of data stored in the second set of data storage with a set of corresponding data stored in the first set of data storage subsequent to a remote replication.

According to a particular embodiment, the method furthermore may comprise duplicating data stored in a first subset of data storage of the first set of data storage in a second subset of data storage of the first set of data storage so as to improve the reliability of the storage system.

According to a particular embodiment, the method furthermore may comprise a prior copying of data of a third set of data storage to the first set of data storage.

According to a particular embodiment, the remote replication command can be generated in a periodic manner.

In another aspect, there is also a non-transitory computer readable product encoded with instructions adapted to direct a computer or processor to carry out the method described previously when the program is executed on a computer or processor. The advantages afforded by this computer program product are similar to those mentioned previously.

BRIEF DESCRIPTION OF THE DRAWINGS

Other advantages, features and characteristics of the present application emerge from the detailed description which follows, given by way of non-limiting example, in regard to the appended drawings in which:

FIG. 5, comprising

DETAILED DESCRIPTION OF CERTAIN INVENTIVE EMBODIMENTS

Generally, the application makes it possible, according to certain embodiments, by using a technology of a Redundant Array of Independent Disks (RAID) type and a dual controller of disks, more generally called a memory controller hereinafter, on each storage system of at least one of the remote sites, during a data synchronization phase, not to disturb the performance of the site where the original data are situated (sender site) while synchronizing these data on the site where they are replicated (receiver site).

According to certain embodiments, a memory dual controller can be present on each or certain storage systems of each or certain remote sites, with a unidirectional, bidirectional or multidirectional communication mode.

According to certain embodiments, the data can be replicated at two levels (a first level corresponding to a local replication and a second level corresponding to a remote replication) and in an asynchronous manner, that is to say according to predetermined time intervals, for example every thirty minutes. This solution can be based on the use of an additional memory controller and of means for duplicating a stream of commands and of data.

It is firstly recalled that a data storage mechanism of RAID type uses several distinct storage means, typically hard disks, each storing a part of a data item. Such a mechanism makes it possible, in particular, to improve the data access time, when reading and when writing, by parallelizing several tasks, and to improve the reliability of storage. Indeed, by using disks to store redundant and/or parity data, generally obtained on the basis of distinct mechanisms, generically called redundancy data, it is possible to recover data when parts of data stored on disks are lost.

An example of such a mechanism is known by the name RAID-6 Dual Parity (DP). According to the latter, a storage system can comprise, for example, eight disks for storing data and two disks for storing redundancy data (8+2 storage system). Such systems make it possible to implement a quorum mechanism making it possible to detect and correct errors.

It should be noted that any other mechanism of RAID type implementing a data replication mechanism can be used.

Figure 1:
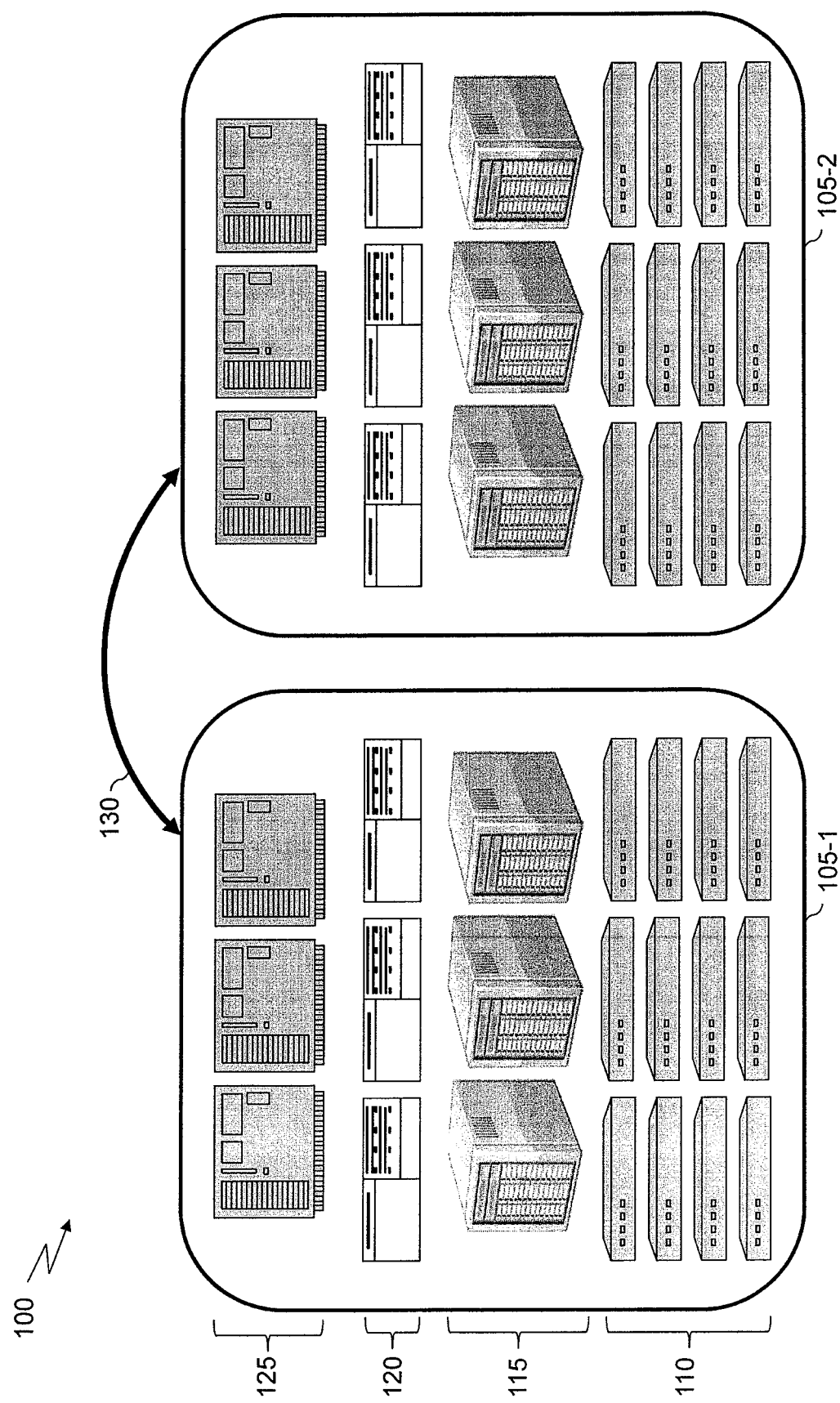
FIG. 1 is a diagram that illustrates an example of an IT infrastructure offering activity resumption functions.
Figure 2:
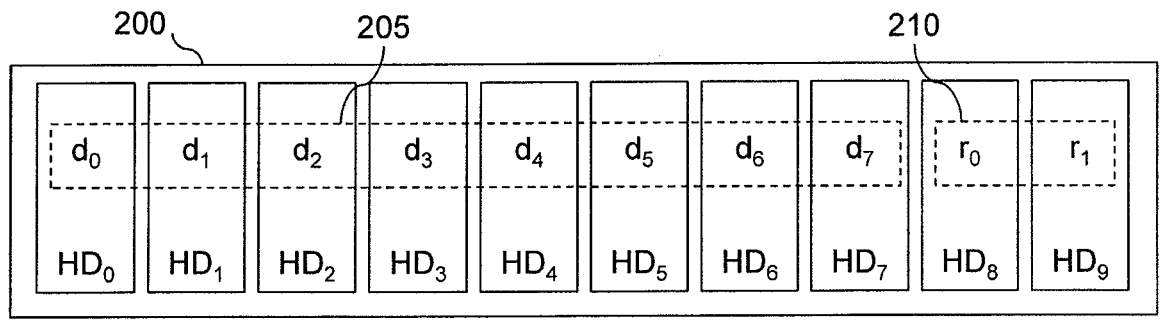
FIGS. 2 and 3 are diagrams that schematically illustrate the storage of a data item in the form of data elements and of redundancy data elements in a set of disks.

Thus, by way of non-limiting example and as represented in FIG. 2, a data item D can be divided into eight data elements $d_0$ to $d_7$, each being stored on a particular disk (data disks $HD_0$ to $HD_7$) of a storage system 200 comprising ten hard disks. These data elements $d_0$ to $d_7$ can be used to compute redundancy elements $r_0$ and $r_1$ which can each be stored on a particular disk (parity disks $HD_8$ and $HD_9$). The data item D can thus be stored in the form of eight data elements referenced 205 and two redundancy elements referenced 210.

According to certain embodiments, the eight disks used to store the data can be grouped together in twos, each pair of disks comprising the same parts of a data item (a mechanism known by the name RAID-1 or mirroring). Thus, in the case of failure of a disk of a pair of disks, the data item can be reconstructed. The redundancy data make it possible to detect and, if appropriate, correct an error which would affect two disks of one and the same pair of disks.

Figure 3:
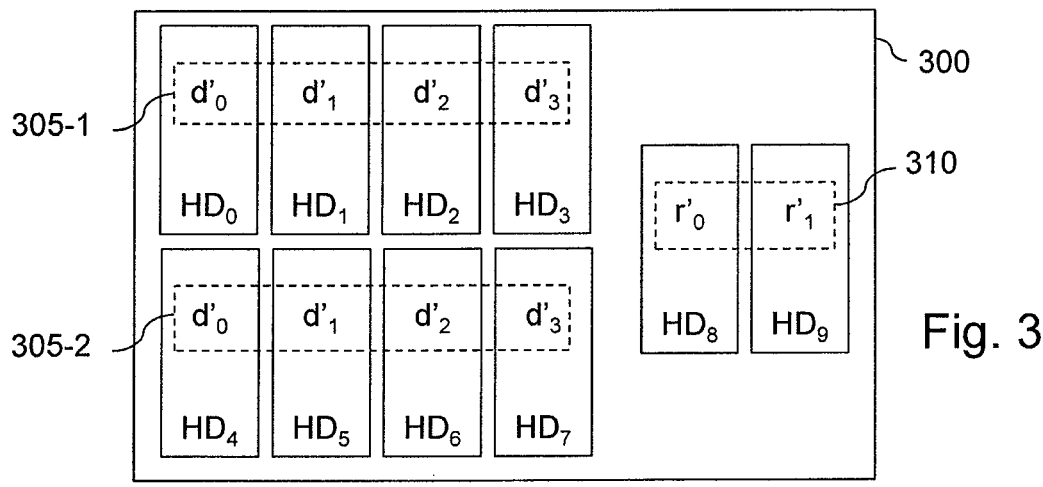

As represented in FIG. 3, a data item D can be divided into four data elements $d'_0$ to $d'_3$, each being stored on two distinct particular disks, denoted HD, of a storage system 300 comprising ten hard disks. These data elements $d'_0$ to $d'_3$ can be used to compute redundancy elements $r'_0$ and $r'_1$ which can each be stored on a particular disk (parity disks). The data item D can thus be stored twice in the form of four data elements referenced 305-1 and 305-2 and of two redundancy elements referenced 310.

The reading and writing of data in the storage system 300 can be controlled by a memory controller (not represented) in charge of processing a stream of commands and of data arising from a microprocessor, that is to say converting this stream into read and write requests.

According to certain embodiments, a local level of replication is added to the storage system. A second memory controller can be associated with this local replication level. A microcontroller (or microprocessor) can be in charge of steering one and the same stream of commands and of data to the two memory controllers in a normal mode of use and of allowing distinct accesses to the two memory controllers in a mode of offloaded replication.

Figure 4:
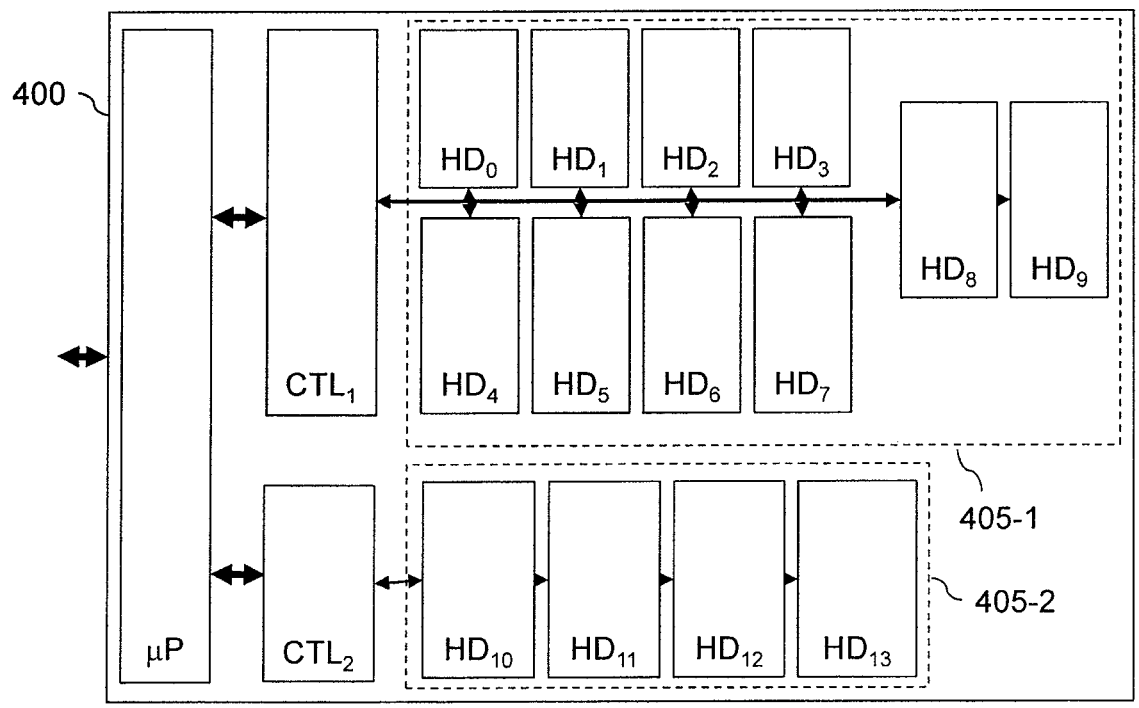
FIG. 4 is a diagram that illustrates an exemplary storage system according to certain embodiments.

FIG. 4 illustrates an exemplary storage system according to certain embodiments. As illustrated, the storage system 400 can comprise two sets of hard disks 405-1 and 405-2. Each disk of the first set of hard disks 405-1, referenced $HD_0$ to $HD_9$, can be linked to a first memory controller $CTL_1$ while each disk of the second set of hard disks 405-2, referenced $HD_{10}$ to $HD_{13}$, can be linked to a second memory controller $CTL_2$.

The first set of disks 405-1 can comprise several pairs of disks (for example, the pairs $HD_0$-$HD_4$, $HD_1$-$HD_5$, $HD_2$-$HD_6$ and $HD_3$-$HD_7$), each disk of one and the same pair being used to store one and the same data element as described with reference to FIG. 3, as well as parity disks (for example, the disks $HD_8$ and $HD_9$). Alternatively, each disk of the first set of disks 405-1 can be used to store different data elements or redundancy data elements.

The second set of hard disks 405-2 can comprise as many disks (for example, the disks $HD_{10}$ to $HD_{13}$) as there are pairs of disks in the first set of disks 405-1, each disk of the second set of hard disks 405-2 storing a data element stored in each disk of a distinct pair of disks. Stated otherwise, one and the same data element can be stored in each disk of a pair of disks of the first set of hard disks 405-1 and in a disk of the second set of hard disks 405-2, offering a first level of replication (local replication). Alternatively, when each disk of the first set of disks 405-1 is used to store different data elements or redundancy data elements, the second set of hard disks 405-2 can comprise as many disks as there are disks in the first set of disks 405-1 used to store data elements.

The memory controllers $CTL_1$ and $CTL_2$ can be moreover linked to a microcontroller (or microprocessor) μP the object of which can be in particular to connect the memory controllers $CTL_1$ and $CTL_2$ to one and the same external device or to two distinct devices. Alternatively, a logic circuit of Application-Specific Integrated Circuit (ASIC) type can be used.

In a normal mode of use, the microcontroller μP can be in charge of steering one and the same stream of commands and of data to the two memory controllers $CTL_1$ and $CTL_2$. The stream of commands and of data steered toward the two memory controllers can be the one intended for the first controller associated with the set of disks comprising the disks used to store the redundancy data.

In this mode of use, the read commands are typically ignored by the second memory controller $CTL_2$ so that data can be obtained, in a conventional manner, from the disks of the first set of disks. However, according to certain embodiments, data elements stored in one or more disks of the second set of disks can be used, in particular if two disks of one and the same pair of disks of the first set of disks have failed.

The write commands can be processed in parallel by each memory controller $CTL_1$ and $CTL_2$, in such a way that the data elements can be stored in a redundant manner in each disk of a pair of disks of the first set of disks and in a disk of the second disk set (local replication).

In a particular mode of use, allowing a replication of the data of second level (remote replication), the microcontroller μP can be in charge of steering two distinct streams of commands and of data toward the two memory controllers $CTL_1$ and $CTL_2$, in a distinct manner, so that data elements can be accessible (in read and write mode) in each disk of the first set of disks, by a first external device, and that, independently, the same or other data elements can be accessible (typically in read-only mode) in each disk of the second set of disks, by a second external device. The first device can be, for example, a computation node of a high-performance computation cluster, or High Performance Computing (HPC) cluster, while the second external device can be an IT system of a remote site, typically a storage system on which the data can be replicated (second level of replication corresponding to a remote replication).

The architecture illustrated in FIG. 4 thus makes it possible, firstly, to manage a first level of replication of data on the second set of disks simultaneously with the management of the read-access and write-access on the first set of disks, without degrading the performance of the storage system. This architecture also makes it possible, during the replication of data according to a second level of replication, during a phase of remote replication, on the basis of the second set of disks, to leave the first set of disks fully operational. Stated otherwise, the performance of the first set of disks, in read and/or write mode, is not impacted by a data replication performed on the basis of the second set of disks.

Figure 5A:
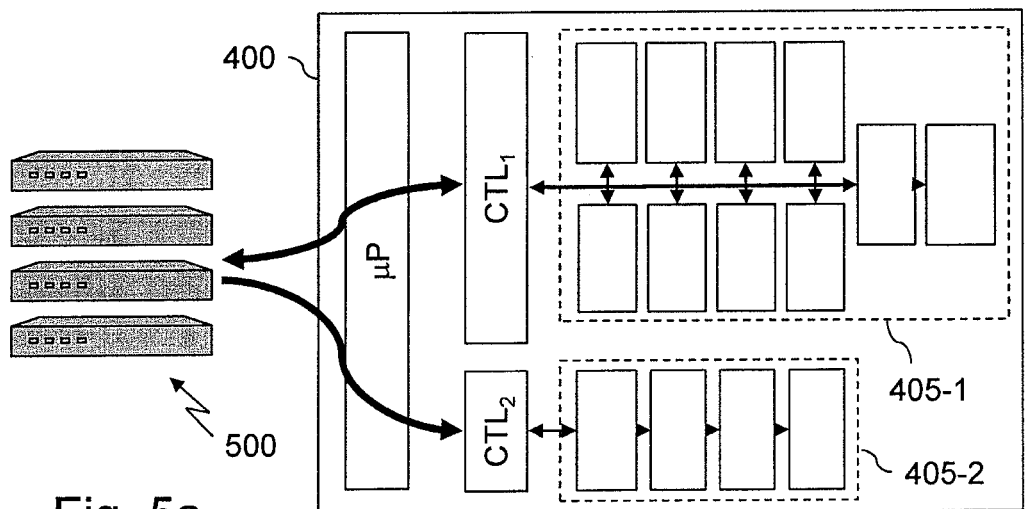
FIGS. 5a, 5b and 5c, is a diagram that schematically illustrates a phase of read-access and/or write-access to data, allowing a local replication of data (replication of first level), a phase of remote replication of data (replication of second level) and a phase of updating, respectively, in a storage system such as that described with reference to FIG. 4.
Figure 5B:
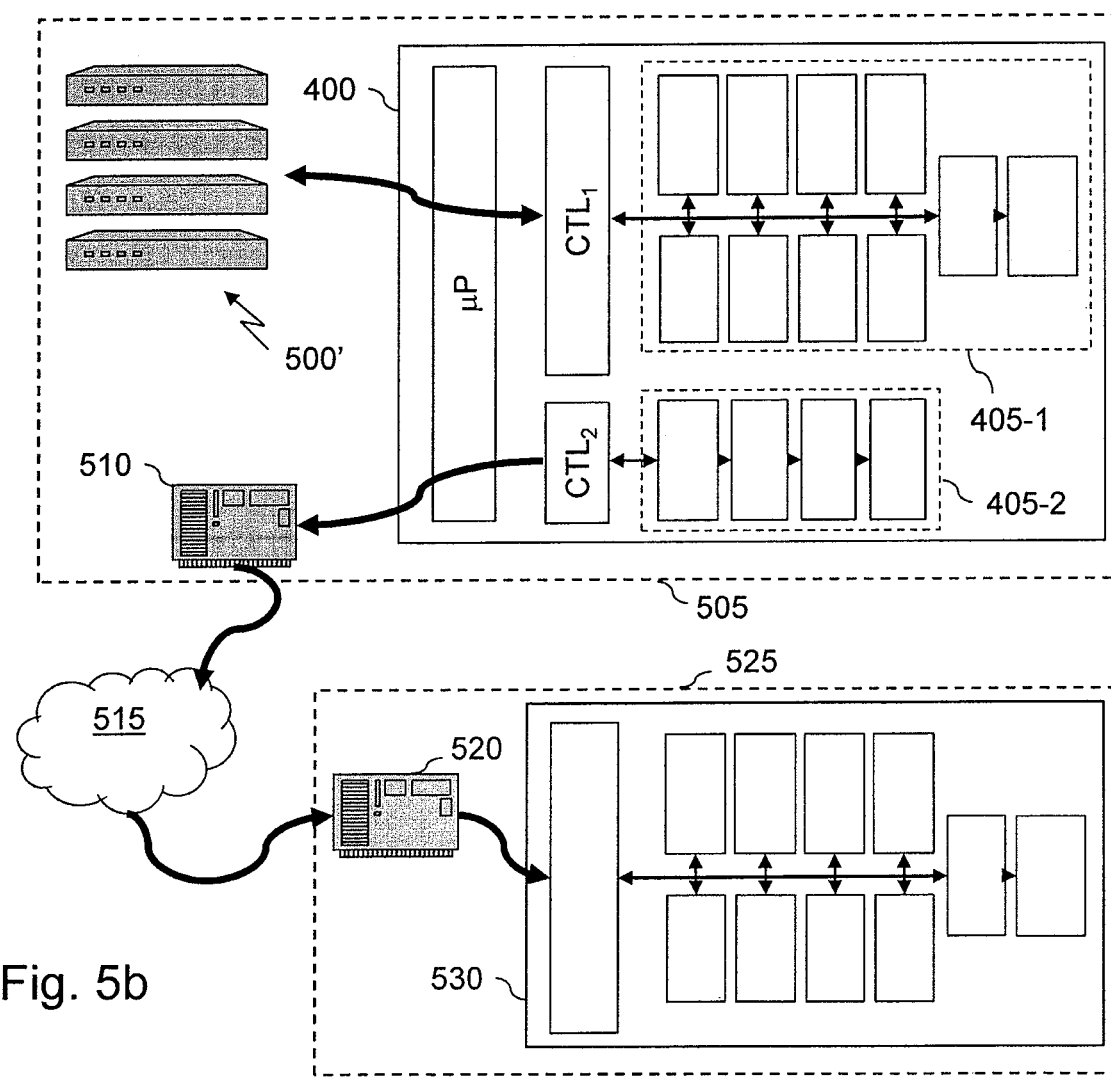
Figure 5C:
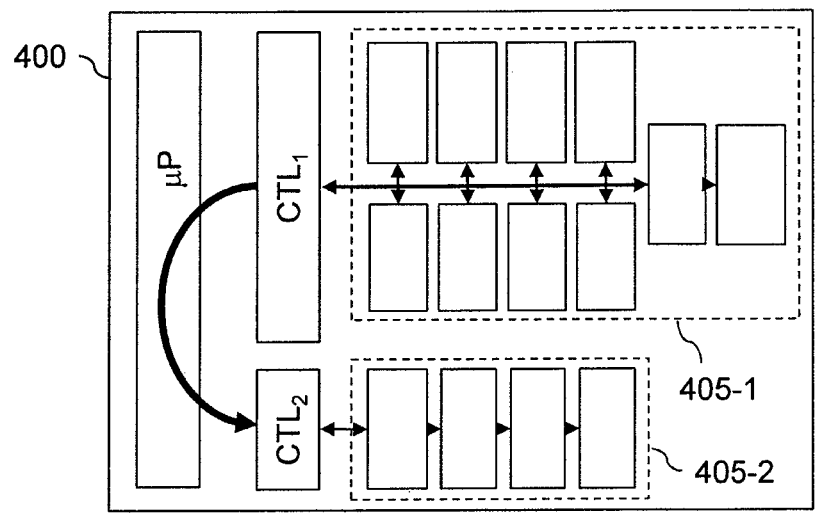

FIG. 5, comprising FIGS. 5*a*, 5*b* and 5*c*, schematically illustrates a phase of read-access and/or write-access to data, allowing a local replication of data (first level replication), a phase of remote replication of data (second level replication) and a phase of updating, respectively, in a storage system such as that described with reference to FIG. 4. The microcontroller μP can be used, in particular, to control a mode of use making it possible to manage these phases.

As illustrated in FIG. 5*a*, the storage system 400 makes it possible, in a normal phase of use, with the aid of a microcontroller μP to steer one and the same stream of commands and of data toward the two sets of disks 405-1 and 405-2 of the system via the two memory controllers $CTL_1$ and $CTL_2$ (each associated with a set of disks). As described previously, to avoid conflicts during the reading of data on the basis of the system, the read commands received by the memory controller $CTL_2$ can be ignored (alternatively, they are not transmitted to it). Stated otherwise, access to the memory controller $CTL_2$ can be effected in write mode only.

The write commands can be processed in parallel by each memory controller $CTL_1$ and $CTL_2$, so that the data elements can be stored in a redundant manner in each disk of a pair of disks of the first set of disks and in a disk of the second set of disks (local replication).

Thus, in a phase of normal use, the system 400 can receive data from devices 500, for example computation nodes, so as to store them and transmit data to these devices. The data stored in the storage system 400 can be, for example, data generated or processed locally, for example data arising from the devices 500.

In a replication phase, illustrated in FIG. 5*b*, the microcontroller μ can be configured to steer two distinct streams of commands and of data toward the two memory controllers $CTL_1$ and $CTL_2$, in a distinct manner.

Thus, according to the example represented, data elements can be accessible (in read and write mode) in each disk of the first set of disks 405-1, via the memory controller $CTL_1$ by the devices 500 which, like the storage system 400, belong to the IT system 505 of a first site.

The IT system 505 can furthermore comprise a gateway 510 which allows the establishment of a communication link, via a communication network 515, with a gateway 520 of an IT system 525 of a second site. Thus, according to the example presented, data elements can be copied over from disks of the second set of disks of the storage system 400 to a storage system 530 of the second site so as to allow the latter to store data stored in disks of the second set of disks (remote replication). Such a replication may be performed in a periodic manner, by way of illustration every thirty minutes, or, for example, when the volume of modified data attains a predetermined threshold.

Access to the memory controller $CTL_2$ can be effected, during this replication phase, in read mode only.

As described previously, the content of each disk of the second set of disks must correspond to the content of the disks of each pair of disks of the first set of disks (first replication level) so as to allow, by replication of these data, the resumption of activity according to the embodiment described previously. Consequently, after different streams of commands and of data have been steered toward the memory controllers $CTL_1$ and $CTL_2$, that is to say during a replication phase, it may be appropriate to update the content of the disks of the second set of disks in regard to the content of the disks of the first set of disks.

Such an updating can be advantageously carried out on completion of a remote replication phase. It relates to the data stored in the disks of the first set of disks, which have been modified, added and/or deleted since the last update. This updating phase during which data elements of disks of the first set of disks can be copied to disks of the second set of disks is represented in FIG. 5c. It can be performed by the microcontroller μP via the memory controllers $CTL_1$ and $CTL_2$.

Thus, stated otherwise, a principle of certain embodiments is the deactivation of the synchronization of the replication of data between the two memory controllers used in the storage system (replication of first level) during the phase of replication to the remote site (replication of second level). The remotely replicated data can be therefore the data stored in the second set of disks during deactivation of the synchronization. The remote replication can be performed with the aid of the second memory controller, without disturbing the first memory controller (thereby allowing devices, typically computation nodes, to use the storage system, with the aid of the first memory controller, without particular disturbance).

After the synchronization of the remotely replicated data has been performed (replication of second level), the storage space used for this offloaded replication can be updated, for example by using a reconstruction mechanism of the RAID type. Next, the synchronization of the local replication of data between the two memory controllers used in the storage system, by duplication of the stream of commands and of data to the two memory controllers used, can be reactivated.

It is observed that the updating of the storage space used for the offloaded replication can be based on accesses to a single disk of each pair of disks of the first set of disks.

Figure 6:
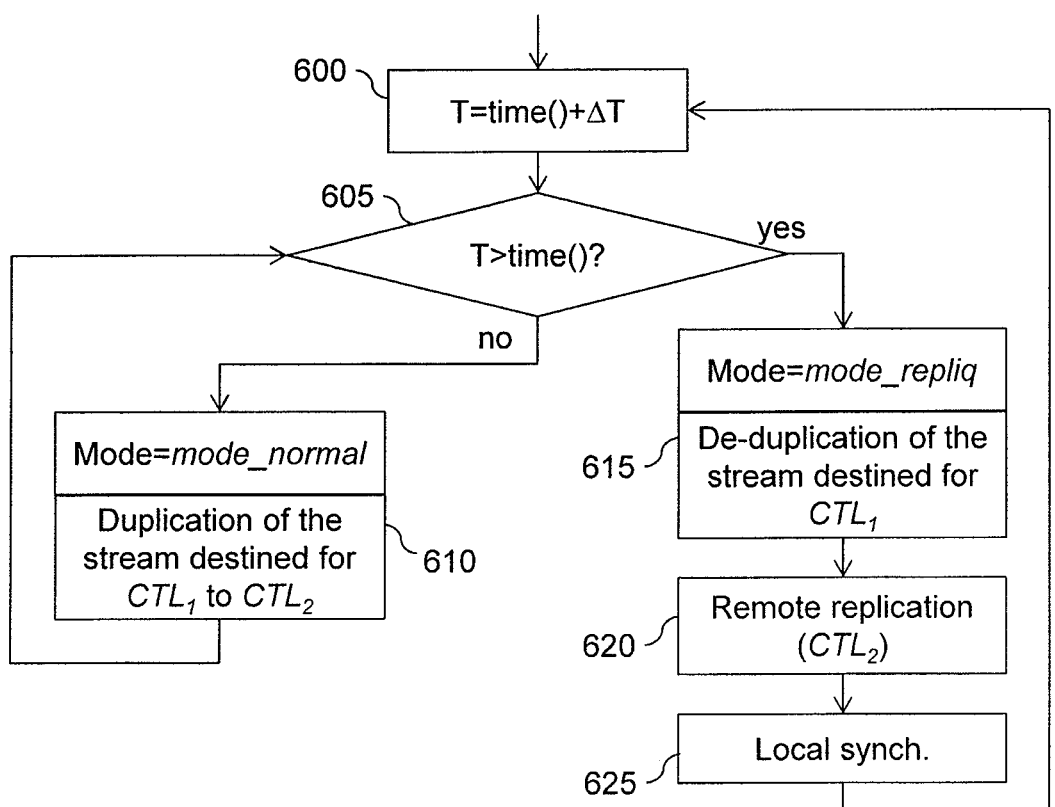
FIG. 6 is a flowchart that schematically illustrates certain steps of an exemplary algorithm for data replication according to certain embodiments.

FIG. 6 schematically illustrates certain steps of an exemplary algorithm for replicating data according to certain embodiments. Such a method can in particular be implemented in a microcontroller such as the microcontroller μP illustrated in FIG. 4 or, more generally, in a computer.

As illustrated, the object of a first step (step 600) can be the determination of the present instant with the aid of a standard function, identified as time ( ) and the storage of this instant, incremented by a predetermined duration ΔT which represents the periodicity of offloaded replication, in a variable T.

A test can be thereafter performed (step 605) to determine whether the value of the variable T is greater than the present instant such as determined with the function time( ) that is to say whether it may be appropriate to perform a remote replication.

In certain embodiments, if the value of the variable T is less than or equal to the present instant, the storage system can be placed or maintained in a normal mode of use (mode_normal) according to which the stream of commands and of data addressed to the first memory controller ($CTL_1$) can be duplicated so as to also be addressed to the second memory controller ($CTL_2$) thus allowing a local replication of the data in the second set of disks (step 610). As illustrated, this step can be repeated as long as the value of the variable T is less than or equal to the present instant (and as long as the system is not shut down).

If, on the contrary, the value of the variable T is greater than the present instant, the storage system can be placed in a mode of particular use (mode_repliq) according to which the stream of commands and of data addressed to the first memory controller ($CTL_1$) can be de-duplicated, if it was, so as to be addressed only to the first memory controller (step 615). The data stored in the second set of disks can then be replicated remotely as described previously (step 620).

In a following step, a synchronization can be performed (step 625) in such a way that the data stored in the second set of disks correspond to the data stored in the first set of disks. As illustrated, on completion of this step, the algorithm loops back to step 600 to reinitialize the variable T and repeat the previous steps.

Although an offloaded replication command can be generated in a periodic manner, by comparing the current time with a past current time incremented by the period, such a command can be generated according to other criteria, for example according to a volume (typically compared with a threshold) of modified data, or by other applications.

According to certain embodiments, using a data migration function, several local storage systems can be used and just one (or several) storage system can be provided with a second memory controller and with means for duplicating a stream of commands and of data. Thus, it can be possible to migrate, to the storage system provided with this second memory controller and with these duplication means, all the data that have been modified since a last remote replication. It is then possible to implement a process similar to that described with reference to FIGS. 5 and 6.

Figure 7:
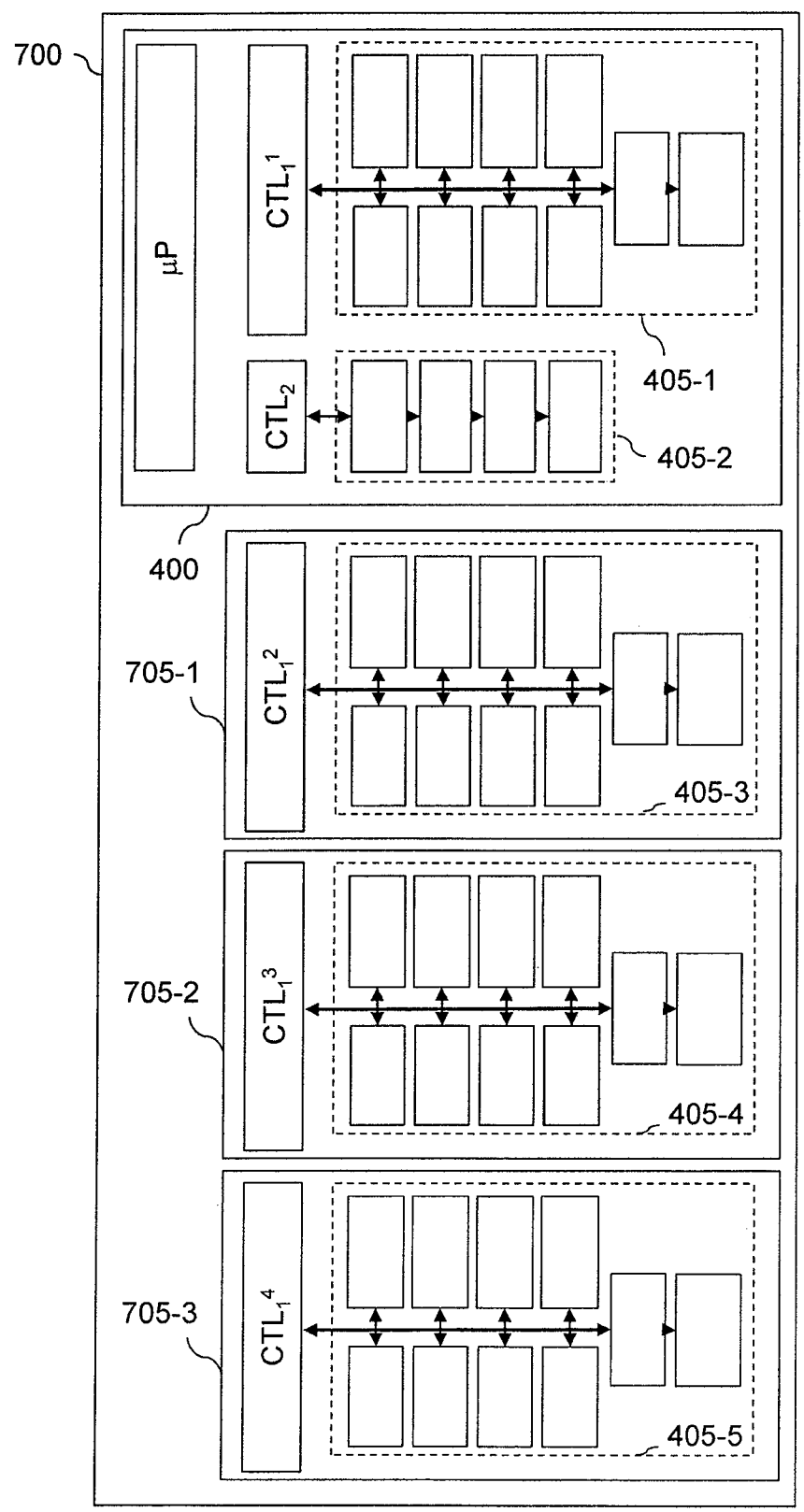
FIG. 7 is a diagram that illustrates a storage system comprising several standard storage sub-systems and at least one storage sub-system such as that described with reference to FIG. 4, offering a dual level of replication while limiting the cost of the storage system.

FIG. 7 illustrates a storage system that may comprise several standard storage sub-systems and at least one storage sub-system such as that described with reference to FIG. 4, offering a dual level of replication while limiting the cost of the storage system.

In the non-limiting example represented, the storage system 700 may comprise a storage subset 400 such as that described with reference to FIG. 4, comprising two sets of disks denoted 405-1 and 405-2 with which are associated two memory controllers $CTL_1^1$ and $CTL_2$.

The storage system 700 furthermore may comprise three standard storage sub-systems referenced 705-1 to 705-3 each comprising a set of disks (405-3 to 405-5, respectively) with which can be associated a memory controller ($CTL_1^2$, $CTL_1^3$ and $CTL_1^4$).

In this architecture, all the data modified since the last remote replication can be copied into the sets of disks 405-1 and 405-2 to allow a remote replication without actual disturbance of the devices accessing the data stored in the storage system. Thus, when a remote replication operation is to be performed, the mechanism implemented can be similar to that described with reference to FIGS. 5 and 6. It may comprise, prior to the step of de-duplicating the stream of commands and of data, a step of copying the data modified into the sets of disks 405-1 and 405-2.

The data to be replicated can be processed, while being copied to the set of disks 405-1 allowing remote replication without actual disturbance, at the level of the file system, block by block or bitwise (also called raw mode). Such a choice can be performed according to the needs and the constraints of implementation. File based copying may require file system based management on each of the systems involved. On the other hand, bitwise copying may require the determination of the physical address of the location where the data to be copied are stored. Such an address can be generally determined on the basis of information obtained via a file system.

Naturally, to satisfy specific needs, a person skilled in the field of the invention will be able to apply modifications in the above description. The present invention is not limited to the embodiments described; other variants and combinations of characteristics may be possible. In particular, the invention can be implemented with storage systems of various kinds, for example mass memories using hard disks of magnetic type, hard disks of optical type, hard disks of Solid State Device (SSD) type and/or combinations of such mass memories.

The present invention has been described and illustrated in the present detailed description with reference to the attached figures. However, the present invention is not limited to the embodiments presented. Other variants and embodiments can be deduced and implemented by the person skilled in the field of the invention on reading the present description and the appended figures.

In the claims, the term "comprise" does not exclude other elements or other steps. The indefinite article "a" does not exclude the plural. A single processor or several other units may be used to implement the claimed invention. The various characteristics presented and/or claimed may be advantageously combined. Their presence in the description or in different dependent claims does not in fact exclude the possibility of combining them. The reference signs should not be understood as limiting the scope of the invention.

The invention claimed is:

1. A device for saving data in an information technology (IT) infrastructure offering activity resumption functions, the device comprising:
at least one first and one second sets of data storage, wherein the first set of data storage is local with respect to the second set of data storage;
at least one first and one second memory controllers, the first memory controller being associated with the first set of data storage and the second memory controller being associated with the second set of data storage, wherein the first memory controller is local with respect to the second memory controller; and
a microcontroller adapted to:
access the second memory controller in a write-only mode when in a mode of normal use,
access the second memory controller in a read-only mode when in a mode of remote replication,
duplicate a stream of commands received by the microcontroller from a microprocessor and of data destined for the first memory controller to the second memory controller when in the mode of normal use, allowing a local replication of data, originating from a first external device that is local with respect to the device, in the second set of data storage, and to
address a separate stream of different commands received by the microcontroller to each of the first and second memory controllers when in the mode of remote replication, allowing access to the second memory controller to read, in the read-only mode, the data locally replicated in the second set of data storage such that a remote device remotely replicates the data in a third set of data storage that is remote with respect to the device.

2. The device according to claim 1, wherein the microcontroller is furthermore adapted to synchronize a set of data stored in the second set of data storage with a set of corresponding data stored in the first set of data storage subsequent to a remote replication and before a local replication.

3. The device according to claim 1 wherein the first set of data storage comprises at least two subsets of data storage allowing a duplication of data between the at least two subsets of data storage.

4. The device according to claim 3, wherein the at least two subsets of data storage are adapted to store like data elements.

5. A method for a computer for saving data in an information technology (IT) infrastructure offering activity resumption functions, allowing the saving of data in a device comprising at least one first and one second sets of data storage and at least one first and one second memory controllers and a microcontroller, the first memory controller being associated with the first set of data storage and the second memory controller being associated with the second set of data storage, and the microcontroller linked to the at least one first and one second memory controllers, the method comprising:
accessing, by the microcontroller, of the second memory controller in a write-only mode when in a mode of normal use,
accessing, by the microcontroller, of the second memory controller in a read-only mode when in a mode of remote replication,
duplicating, by the microcontroller, a stream of commands received by the microcontroller from a microprocessor and of data destined for the first memory controller to the second memory controller when in the mode of normal use, allowing a local replication of data, originating from a first external device that is local with respect to the device, in the second set of data storage, and
in response to a remote replication command received by the microcontroller placing the computer in the mode of remote replication, transmission of a separate stream of different commands to each of the first and second memory controllers, allowing a remote replication, allowing access to the second memory controller to read, in the read-only mode, the data locally replicated in the second set of data storage such that a remote device remotely replicates the data in a third set of data storage that is remote with respect to the device, wherein the first set of data storage is local with respect to the second set of data storage, and wherein the first memory controller is local with respect to the second memory controller.

6. The method according to claim 5, further comprising synchronizing a set of data stored in the second set of data storage with a set of corresponding data stored in the first set of data storage subsequent to the remote replication.

7. The method according to claim 5, further comprising duplicating data stored in a first subset of data storage of the first set of data storage in a second subset of data storage of the first set of data storage.

8. The method according to claim 5, further comprising a prior copying of data of a fourth set of data storage to the first set of data storage.

9. The method according to claim 5 wherein the remote replication command is generated in a periodic manner.

10. A non-transitory computer readable product encoded with instructions adapted to direct a computer or processor to carry out the method according to claim 5 when the program is executed on a computer or processor.

11. The device according to claim 1, wherein at least one of the first set and the second set of data storage comprises a redundant array of independent disks (RAID) type data replication system.

12. The device according to claim 1, wherein at least one of the first set and the second set of data storage comprises a dual-parity redundant array of independent disks (RAID-6) type storage system.

13. The device according to claim 1, wherein at least one of the first set and the second set of data storage comprises a mirroring redundant array of independent disks (RAID-1) type storage system.

14. The device according to claim 1, wherein the separate stream of different commands comprises transmission of write commands to the first memory controller and transmission, in read commands to the first memory controller, of different addresses than in read commands transmitted to the second memory controller.

15. The method according to claim 5, wherein the separate stream of different commands comprises transmission of write commands to the first memory controller and transmission, in read commands to the first memory controller, of different addresses than in read commands transmitted to the second memory controller.

16. The device according to claim 1, wherein the first set of data storage comprises a plurality of disks,
wherein the second set of data storage comprises a plurality of disks, and
wherein the second set of data storage comprises as many disks as there are pairs of disks in the first set of data storage, each disk of the second set of data storage storing at least one data element that is stored in each disk of a distinct pair of disks of the first set.

17. The device according to claim 1, wherein the first and second memory controllers comprise physically distinct memory controllers.

18. The device according to claim 1, wherein the microcontroller is configurable to independently direct two distinct streams of commands and of data to the first and second memory controllers, via independent communications paths.

19. The device according to claim 1, wherein the first external device is a computation node of a high-performance computation cluster.

* * * * *